(12) United States Patent
Soria et al.

(10) Patent No.: US 6,472,016 B1
(45) Date of Patent: Oct. 29, 2002

(54) MEMBRANE COMPRISING A POROUS CARRIER AND A LAYER OF A MOLECULAR SIEVE AND ITS PREPARATION

(75) Inventors: Raymond Soria, Bazet; Philippe Chanaud, Tarbes, both of (FR)

(73) Assignee: Societe des Ceramiques Techniques, Bazet (FR)

( * ) Notice: Subject to any disclaimer, the term of this patent is extended or adjusted under 35 U.S.C. 154(b) by 0 days.

(21) Appl. No.: 09/453,199

(22) Filed: Dec. 2, 1999

(30) Foreign Application Priority Data

Dec. 4, 1998 (FR) .............................. 98 15375

(51) Int. Cl.⁷ .............................. B01D 53/22
(52) U.S. Cl. .................. 427/245; 55/524; 55/DIG. 5; 96/10; 96/11; 502/64
(58) Field of Search .............................. 55/524, DIG. 5; 95/45, 47, 54, 902; 96/4, 8, 10–12; 502/4, 60, 64, 69; 427/245

(56) References Cited

U.S. PATENT DOCUMENTS

| | | | | |
|---|---|---|---|---|
| 4,971,696 A | * | 11/1990 | Abe et al. .................. 96/11 X |
| 6,152,986 A | * | 11/1990 | Foller ........................ 96/11 X |
| 5,073,178 A | * | 12/1991 | Mimori et al. .......... 55/DIG. 5 |
| 5,104,425 A | * | 4/1992 | Rao et al. .................. 96/11 X |
| 5,429,743 A | * | 7/1995 | Geus et al. ................. 96/11 X |
| 5,453,298 A | * | 9/1995 | Gavalas et al. ........... 96/10 X |
| 5,507,860 A | * | 4/1996 | Rao et al. ................ 55/DIG. 5 |
| 5,614,001 A | * | 3/1997 | Kosaka et al. ............. 96/11 X |
| 5,698,165 A | * | 12/1997 | Terada et al. ............ 55/DIG. 5 |
| 5,716,527 A | * | 2/1998 | Deckman et al. ........... 96/11 X |
| 5,772,735 A | * | 6/1998 | Sehgal et al. ............. 96/10 X |
| 5,871,650 A | * | 2/1999 | Lai et al. .................... 96/11 X |
| 6,074,457 A | * | 6/2000 | Anthonis et al. ........... 96/11 X |
| 6,090,289 A | * | 7/2000 | Verduijn et al. ............ 96/11 X |
| 6,140,263 A | | 10/2000 | Anstett et al. .................. 502/4 |

FOREIGN PATENT DOCUMENTS

| | | | | |
|---|---|---|---|---|
| EP | 0 674 939 A2 | 10/1995 | | |
| EP | 0 778 076 A1 | 6/1997 | | |
| JP | 60-129119 A | * 7/1985 | ............ 96/11 |
| JP | 62140620 | 6/1987 | | |
| JP | 01-310714 A | * 12/1989 | ............ 96/10 |
| WO | WO 93/17781 | 9/1993 | | |
| WO | WO 95/29751 | 11/1995 | | |
| WO | WO 96/01685 | 1/1996 | | |

* cited by examiner

Primary Examiner—Robert H. Spitzer
(74) Attorney, Agent, or Firm—Anderson Kill & Olick; Michael N. Meller; Eugene Lieberstein

(57) ABSTRACT

The invention is directed to a method for preparing a membrane comprising a homogeneous porous carrier, on which a layer of a molecular sieve is deposited, comprising the following steps (i) preparing an inert solution and a precursor solution of the molecular sieve; (ii) impregnating the porosity of the carrier with the inert solution and/or the precursor solution; (iii) bringing the region of the ceramic carrier intended to receive the layer of a molecular sieve into contact with the precursor solution, and bringing the region of the carrier not intended to receive the layer of a molecular sieve into contact with the inert solution; and (iv) forming a molecular sieve in situ. The invention applies e.g., to filtration or gas or liquid fluid separation, reverse osmosis or catalysis.

19 Claims, No Drawings

MEMBRANE COMPRISING A POROUS CARRIER AND A LAYER OF A MOLECULAR SIEVE AND ITS PREPARATION

BACKGROUND OF THE INVENTION

The present invention relates to a novel process for preparing a membrane comprising a porous carrier and a layer of a molecular sieve, as well as to novel membranes. The invention applies to filtration or gas or liquid fluid separation, pervaporation, reverse osmosis or catalysis.

Zeolite membranes constituted by a (macro)porous portion and a zeolite are already known. These materials can be obtained principally by two methods: a method employing a gel and a method employing a (colloidal or oligomeric) solution, such methods comprising several steps. First, a film (gel method) or total impregnation (solution method) is formed, such film or total impregnation containing species able to form a zeolite, following which the zeolite is crystallized under hydrothermal conditions.

These two types of process suffer from major drawbacks.

In both cases, the starting pH during the first step is extremely high. This highly basic pH is not compatible with certain ceramic materials. In effect, the gamma alumina currently employed as the carrier layer for the zeolite is soluble in highly basic media, leading to alumina solubilization in the zeolite precursor, consequently leading to chemical contamination of the zeolite, the alumina having penetrated the desired crystalline structure.

In both cases, the use of large amounts of gel or zeolite precursor solution and the poorly synthesized yield render this process expensive, particularly when structuring agents of the quaternary ammonium type are employed (and all the more so as several synthesis cycles are frequently necessary).

In the case of the gel method, it is difficult to guarantee homogeneity of the gel composition as the gel is formed from different constituents which do not mix homogeneously. As the local composition of the gel varies, the characteristics of the zeolite structure vary and membrane performance is modified. This defect is additionally clearly recognized in European Patent Application 0,481,660, which indicates that spot defects are present. Thus, European Patent Application 0,778,076 discloses production of the gel in situ; the porosity of the carrier is filled with a first solution after which the carrier is brought into contact with a second solution which is immiscible with the first one. Gelification occurs locally at the contact of the two solutions, the gel being essentially formed at the surface of the porous carrier. Gelification modifies the compositions of the solutions and consequently it is not possible to guarantee an identical gel at every point in the porous carrier.

In the article "Characterization and Permeation Properties of ZSM-5 Tubular membranes", AIChE Journal, July 1997, Vol. 43, No. 7, Coronas et al. studied the influence of the carrier on zeolite layer deposition. Two asymmetric membranes were tested, one with a layer of 5 nm pore diameter γ-alumina and the other with a layer of α-alumina of pore diameter 0.2 μm. The method used by Coronas et al. is a gel method. Coronas et al. conclude that it is easier to form a continuous zeolite layer on an γ-alumina type carrier (5 nm) than on an α-alumina type carrier (0.2 μm), which, in the latter case, necessitates repetition of the process.

Supplementary deposition-crystallisation cycles are in fact always necessary in the case of gel processes for improving the quality of the membrane and for thus obtaining a product which effectively allows separation. The zeolite layer obtained by the gel methods is consequently in point of fact a multi-layer.

Furthermore, because of their high viscosity, the gels block channels of a diameter which can reach several millimeters. This technique is consequently reserved for flat structures or tubes of considerable inside diameter. Thus, all the examples in European Patent Application 0,778,076 employ plane-surface carriers as well as the majority of the examples in European Patent Application 0,481,660, example 12 of this application employing tubes with an inside diameter of about 6.5 mm. Now, the use of a ceramic carrier of tubular geometry (whether this be single- or multi-channel) where the channels are of significant diameter, or of flat geometry, does not make it possible to obtain filtration modules or gas separation modules which are highly compact, in other words which have a large filtering surface compared to the space they occupy. Indeed, it is accepted that the compactness for plane-membrane modules is of the order of 150 $m^2/m^3$, while that of multi-channel membrane modules only reaches 300 $m^2/m^3$; these degrees of compactness are very low when compared to those required for gas separation applications.

In the case of methods employing a solution as in international application WO-A-9529751, it is also stated that the nucleation of the zeolite, previously necessary for its formation, cannot be done for volumes the characteristic dimension of which is greater than about 10 microns and/or less than 5 nm. According to that document, it is consequently impossible to obtain nucleation and growth outside a specific porous material. This consequently rules out the formation of layers whether this be inside or outside the tube, as well as for tubes in macroporous carriers, the mean pore diameter of which is for example higher than 10 microns.

Additionally, the solution method in international application WO-A-9529751 involves impregnation throughout the total porous volume (having a suitable dimension), and consequently the zeolite occupies the totality of the carrier and is not precisely localized (for example in the form of a layer). This absence of localization is prejudicial to the efficiency of the composite material at the time of its use; it is perfectly known that gas permeability through a zeolite membrane is linked to the thickness of the zeolite. The thicker the zeolite, the more permeability diminishes for a separation efficiency, which is not affected.

The solution provided in EP-A-0674939 is similar to the one disclosed in WO-A-9529751.

Thus, the formation, using a gel method, of a zeolite layer on a carrier (for example of around 0.2 μm pore diameter) requires the gel method to be repeated. A solution method, according to WO-A-9529751 does not produce a zeolite layer on the carrier, but in the latter, to the exclusion of a layer thereon, and does not make layer formation possible in or on the carrier, for pore diameters greater than 10 microns.

One consequently looks for materials having a zeolite layer, notably at the inner channels of a multi-channel carrier, this layer requiring to be homogeneous both from a chemical point of view as well as from a physical point of view, in the form of a unitary defect-free layer, the preparation requiring additionally to be simple and economical.

None of the documents cited above offers a solution, nor teaches or suggests the present invention.

SUMMARY OF THE INVENTION

The present invention discloses a solution for overcoming these disadvantages.

According to a first aspect, the invention offers new products as well as a novel production method.

Consequently, the invention provides a membrane comprising a homogeneous porous carrier having a pore diameter comprised between 5 nm and 20 µm, on which a zero-defect unitary layer of a molecular sieve is deposited.

In one preferred embodiment, the unitary layer is a single layer.

In a further preferred embodiment, the thickness of the layer of a molecular sieve is comprised between 1 and 100 µm, for example between 50 nm and 2 µm, for example between 3 and 50 µm.

The molecular sieve is preferably a zeolite.

According to a preferred embodiment, the carrier has a pore diameter comprised between 5 nm and 10 µm and preferably between 50 nm and 2 µm.

In one embodiment, the carrier is a ceramic carrier.

In a further embodiment, the carrier is a fiber, for example a multi-channel fiber. The layer of molecular sieve can be arranged on the outside of the fiber, or the layer of molecular sieve can be arranged inside the channel or channels of the fiber, or the layer of molecular sieve can be arranged on the outside of the fiber, the molecular sieve being additionally present within the thickness of the fiber, or the layer of molecular sieve can be arranged inside the channel or channels of the fiber, the molecular sieve being additionally present in the thickness of the fiber.

The invention also provides a module comprising membranes according to the invention.

The invention also covers the use of this module for gas separation.

The invention also provides a method for separating gas comprising the step of permeation on a membrane according to the invention.

Thus, the invention provides a method for preparing these membranes, as well as other conventional membranes, comprising the following steps:

(i) preparing an inert solution and a precursor solution of the molecular sieve;

(ii) impregnating the porosity of the carrier with the inert solution and/or the precursor solution;

(iii) bringing the region of the ceramic carrier intended to receive the layer of a molecular sieve into contact with the precursor solution, and bringing the region of the carrier not intended to receive the layer of a molecular sieve into contact with the inert solution; and (iv) forming a molecular sieve in situ.

According to one embodiment of the method, the carrier is a carrier comprising at least one channel.

In a preferred embodiment, steps (ii) and (iii) comprise:

firstly, filling the volume of the channel or channels and pores of the carrier with the inert solution and, secondly, filling a volume surrounding the outside of the carrier with the precursor solution.

In a further preferred embodiment, steps (ii) and (iii) comprise:

firstly, filling a volume surrounding the outside of the carrier and the pores of the carrier with the inert solution and, secondly, filling the volume of said channel or channels with the precursor solution.

In yet a further preferred embodiment, steps (ii) and (iii) comprise:

firstly, filling the volume of the channel or channels with the inert solution and, secondly, filling a volume surrounding the outside of the carrier and the pores of the carrier with the precursor solution.

In one preferred embodiment, steps (ii) and (iii) comprise:

firstly, filling a volume surrounding the outside of the carrier with the inert solution and, secondly, filling the volume of said channel or channels and of the pores of the carrier with the precursor solution.

In a further preferred embodiment, the precursor solution is an aqueous solution comprising a precursor agent for the molecular sieve and a structuring agent.

The precursor solution can be aged prior to its use for a duration comprised between 1 and 96 hours, for example for a duration comprised between 12 and 72 hours.

In a preferred embodiment, the inert solution is an aqueous solution.

In a further preferred embodiment, step (iv) in the formation of the molecular sieve comprises a hydrothermal synthesis followed by calcinating.

The method is suited to prepare the membranes of the invention but could also, if necessary, be applied to membranes of the prior art, starting out from suitable starting materials.

The invention will now be described in more detail below.

DETAILED DESCRIPTION OF PREFERRED EMBODIMENTS

Porous carrier

The porous carrier for preparing membranes is homogeneous; it distinguishes itself from asymmetric membranes employed up until now in the prior art. Homogeneity should however be evaluated locally in the sense that, thanks to the method of the invention, zeolite formation can be localized. Thus, homogeneity is evaluated at the region in contact (impregnated) with the precursor solution.

The carrier can be a metal, glass, ceramic (for example α-alumina, γ-alumina, titanium oxide, zirconium oxide), etc.

In the following, the description is provided with reference to a "fiber" as the porous carrier; any other type of carriers, notably flat, is covered by the invention.

The fiber is advantageously a porous multi-channel ceramic fiber; it can however be single-channel.

This fiber corresponds to a bar of porous ceramic incorporating one or several channels, said bar of porous ceramic having a porous (in the conventional sense of the term) structure and variable porosity, and the axis of said channels is parallel to the axis of the ceramic bar.

According to one embodiment, the channels are distributed at the vertices of a regular polygon the order of which is comprised between 3 and 6, a supplementary channel being able to occupy the center of the polygon where the order is greater than 3, the order being preferably 5 or 6.

The fiber and/or the channels can have any suitable shape, for example a circular cross-section; channel cross-sections in the shape of orange quarters are possible, and the same can apply to the fiber cross-section, a circular geometry can be replaced by a multi-lobe geometry. In the case of an orange-quarter geometry (or where a channel is not circular), the diameter of such a channel will be defined as the diameter of a circular channel having the same cross-section. Where the fiber does not have a circular cross-section, the diameter of such a fiber is similarly defined as the diameter of a circular fiber having the same cross-section.

The fiber and/or the channels preferably have a circular cross-section.

Preferably again, all the channels are substantially identical; this is one way of limiting pressure drop and throughput differences from one channel to another along the fiber.

According to one embodiment, the fiber (multi-channels or single-channel) according to the invention has the following characteristics:
(i) a channel diameter comprised between 150 and 2000 μm, preferably between 300 and 1,000 μm, and/or
(ii) an envelope ratio Re corresponding to the ratio of porous ceramic fiber diameter to channel diameter such that Re is comprised between 2.5 and 15, preferably between 4 and 10, and/or
(iii) a fill ratio Ro corresponding to a ratio of the sum of channel cross-sections to porous ceramic fiber cross-section such that Ro is comprised between 0.03 and 0.45, preferably between 0.04 and 0.35 and advantageously between 0.15 and 0.35, and/or
(iv) a sustain ratio Rs corresponding to a ratio between mean wall thickness measured along the radius of a fiber and the diameter of a channel passed through, said mean thickness corresponding to the mean of channel wall thickness located on a radius of said fiber passing through a maximum number of channels, such that Rs is comprised between 0.3 and 2.5, preferably between 0.5 and 1.5, and/or
(v) a thickness ratio Rp corresponding to the ratio between channel wall thicknesses along a radius of the fiber passing through a maximum number of channels, such that Rp is comprised between ⅓ and 3, preferably between ½ and 2, thickness ratio Rp being advantageously about 1.

Fiber diameter can extend up to, for example, 25 mm, preferably up to 15 mm; typically this diameter is comprised between 2 and 10 mm, preferably between 3 and 7 mm.

The fiber has a mean pore diameter comprised between 5 nm and 20 μm, preferably between 5 nm and 10 μm, preferably between 50 nm and 2 μm. According to one alternative embodiment, the material of the fiber is a homogeneous bulk porous ceramic material, the mean pore diameter D50 of which is less than 4 μm and the closed porosity of which is less than 2%. D50 is the volume mean diameter such that 50% of the pores have a diameter less than D50.

According to one alternative embodiment, the material has a monodisperse pore diameter distribution; in this embodiment, standard deviation is less than 35%, preferably 25% of the volume mean diameter D50. Typically, in this embodiment, the material will have a standard deviation comprised between 10 and 25% of volume mean diameter D50.

The fiber has a mean porosity comprised, for example, between 10 and 70%, preferably between 35 and 60%.

The fiber can be such that mean pore diameter is comprised between 0.5 and 2 μm and open porosity is comprised between 45 and 60%.

The fibers have a length which may reach several meters; conventionally, the length of a fiber is comprised between 0.5 and 2 m.

The camber of the fibers according to the invention or extent to which they are out of true (deformation due to sintering) is generally low, for example below 0.3%, preferably less than 0.15%, more advantageously less than 0.05%. This low value favors assembly of the fibers into a module.

The fiber is conventionally of ceramic material; advantageously, the ceramic is a metallic oxide.

The method for preparing the fibers comprises three main steps:
(i) Preparation of an inorganic paste comprising an inorganic portion or filler, a binder and a solvent, with optionally a pore-generating agent, a deflocculating agent and/or an extrusion agent;
(ii) shaping said paste by extrusion;
(iii) consolidating this shape by sintering.

The inorganic portion of said paste comprises particles of a mineral compound which, after sintering, will form the porous matrix (homogeneous in its volume). The mineral, preferably metallic, compound is either a non-oxide compound, or a metal oxide. In the case where this is a non-oxide derivative, a silicon or aluminium derivative will be chosen and preferably, silicon carbide, silicon nitride or aluminium nitride. Where the metallic compound is an oxide, this will be selected from oxides of aluminium, silicon or metals of groups IVA (titanium group) or VA (vanadium group) and will preferably be alumina, zirconium oxide or titanium oxide. These oxides can be used alone or in a mixture. The metallic compound has, for example, a mean particle diameter (measured by sedigraph) between 0.15 and 2 μm, and preferably between 0.15 and 0.6 μm. The paste will contain between 50 and 90% by weight of this, and preferably between 65 and 85% by weight. This inorganic filler can advantageously consist of particles the d90 and d50 diameters of which are such that $d90/d50 < 3$ and advantageously $d90/d50 < 2$.

The organic binder gives the paste its necessary rheological properties needed for extrusion and its mechanical properties needed to obtain good cohesion of the product after extrusion. Said organic binder is preferably, but not obligatorily, a water-soluble polymer. The polymer will for example have, for a 2% by weight solution, a viscosity measured at 20° C. comprised between 4 and 10 Pa/s. This polymer can be selected from the celluloses and their derivatives (HEC, CMC, HPC, HPMC, etc.), one can also use a polyacrylic acid, polyethylene glycol, polyvinyl alcohol, etc. . . One can also use, as the binder, a binder that is conventionally used as a compression (or pressing) binder, rather than an extrusion binder, the terms "compression (or pressing) binder" and "extrusion binder" having their conventional sense known to the skilled person. A preferred binder is crystalline, notably a microcrystalline cellulose which will correspond in whole or in part to the binder. The paste will for example contain between 2 and 10% by weight of organic binder and preferably between 3 and 8% by weight.

The role of the solvent is to disperse the inorganic portion and the binder. Where a water-soluble polymer is employed, water will be selected as the solvent; where the polymer is not water-soluble, an alcohol, for example ethanol, will be chosen as solvent. The concentration of the solvent will be comprised between, for example, 8 and 40% by weight and, preferably, between 10 and 27% by weight.

The pore-generating agent is characterized by a low decomposition temperature, for example less than 450° C., preferably less than 250° C. It is additionally characterized by the mean size of the particles composing it, said size being appropriately related to the particle size of the metallic filler. This size is for example comprised between 5 and 30 μm and preferably between 8 and 16 μm. The pore-generating agent is substantially insoluble in the chosen solvent. A pore-generating agent of natural origin can be used and, for example dust of husks, carbon black or powder, or one of artificial origin such as for example low density polyethylene spheres or a water/oil emulsion and for example mobilcer® (oil-in-water emulsion).

The inorganic filler and pore-generating agent particle size can vary independently of each other to a very high degree.

A deflocculating agent that is soluble in the solvent will improve dispersion of the particles of the metal compound. Typically, a polyacrylic acid, a phospho-organic or alkyl-sulfonic acid is chosen. The deflocculating agent content is of the order of 0.5 to 1% by weight.

In certain cases, an agent that aids extrusion such as a polyethylene glycol will be added. The extrusion agent content is of the order of 0.5 to 1% by weight.

These components are mixed in the form of a paste having a capacity of being drawn comprised in general between 9 and 30 bar, and preferably between 10 and 16 bar.

Their bending strength can be modified conventionally by introducing mineral binders into the composition of the paste, which will react during sintering to increase the cohesive forces between the particles.

Shaping is carried out conventionally using extrusion. Using a screw or piston, the paste is forced through a complex die in order to adopt the die geometry. The membrane preforms are collected at the outlet from the die, dried in free air in order to eliminate water or solvent, and are then sintered at a temperature comprised between 1,300 and 1,700° C. for, for example, two hours. Sintering is done under a normal or neutral atmosphere (for example argon) where the paste is metallic oxide-based, and under a neutral atmosphere (for example argon or helium) when the metallic compound is a non-oxide.

The extrusion apparatus is conventional apparatus, specifically comprising a die with, arranged at the center thereof, a crown supporting the slugs which will form the channels. The fiber preforms obtained at the outlet from the extrusion apparatus can be dried and/or sintered in rotating barrels, for example using a technique described in French Patent 2,229,313 in the name of Ceraver.

Molecular sieve

The molecular sieve according to the invention is conventional and is notably a crystalline structure of the zeolite type. Zeolite is for example a crystalline solid having a microscopic three-dimensional structure resulting from the chaining of TO4 tetrahedra (T being for example selected from Si, Al, B, Ga, Ge, and P), each oxygen atom being common to two tetrahedra, leading to a network of channels of molecular dimension (pore diameter varying for example between 3 and 10Å). Structural types are for example FAU, GME, MOR, OFF, MFI, MEL, FER, LTA, TON and CHA, according to IUPAC nomenclature. The molecular sieve can also be an oxide of the metallosilicate type, a portion of the above T elements being replaced, for example by titanium (for example titanosilicate, such as TS-1), manganese, molybdenum, gallium (for example a GAPO (gallophosphate)) boron, zinc, iron and tungsten. The molecular sieve can also be a diatomaceous earth, a crystalline alumina phosphate (ALPO) or a crystalline silicoaluminophosphate (SAPO). One particular example of the molecular sieve is the ZSM zeolite (in particular ZSM-5) or silicalite. The description which follows refers to a zeolite (in particular silicalite), but can extend to all molecular sieves to which the invention applies.

The layer thickness is comprised for example between 1 and 100 $\mu$m, preferably between 3 and 50 $\mu$m, for the portion situated on the outside of the carrier. Some is in general infiltrated into the carrier, to a thickness comprised for example between 0.2 and 10 $\mu$m, preferably between 0.5 and 5 $\mu$m.

This zeolite layer has particular features, notably regarding homogeneity, in the sense that the composition of the deposited layer is not modified by a parasitic phenomenon such as gelification or dissolution of part of the membrane.

These characteristics of the zeolite layer are the following. The zeolite layer is, in the invention, obtained preferably in a single "deposition-crystallization" step. One thus obtains a single layer. One can however also proceed using several steps; but at each step, a "unitary" layer is deposited having the characteristics listed below. Each "unitary" layer (or, if appropriate, single layer) is said to have "zero-defect" in the sense that there is no break in the macroscopic three-dimensional structure. (The term "macroscopic three-dimensional structure" is used in contrast to the term "microscopic three-dimensional structure" which designates the molecular level). This is brought to light by the test consisting of permeating (or attempting to permeate) a gas into the dimension corresponding to the characteristic dimension of the molecular sieve (this dimension being, if need be, weighted taking account of the carrier dimension, notably for carriers having high pore diameter, for example greater then 10 microns). In the present case (in the case of the carrier having a pore dimension for example less than 10 microns) the test gas, for silicalite, is $SF_6$; the present unitary layer is gas-tight for this gas. As against this, the gas nitrogen passes through the layer. In the case of a carrier of 12 micron size, there is also formation of a crystalline network forming, "without a break" on the carrier, meaning the layer is homogeneous and is free of defects, $SF_6$-tightness being obtained in this case using two passes.

The unitary zeolite layer thickness is in general constant at plus or minus 20% preferably 10%, on the carrier.

Membrane and module according to the invention

The membrane is characterized by a zeolite layer, present for example on the inner surface of the fiber channels, a (small) portion of this layer being infiltrated into the porous carrier. This layer can also be located on the outside of the fiber.

The invention makes it possible to obtain localization of the zeolite with respect to fiber geometry, specifically in the form of a unitary layer and no longer in the thickness of the fiber, this unitary layer having "zero-defect".

The membrane is also characterized by the characteristics of the zeolite layer deposited, these characteristics being indicated above.

One of the advantages of the invention is that it makes it possible to obtain highly compact modules by using membranes comprising porous ceramic (micro)fibers with a zeolite layer.

A further advantage of the invention resides in the high separation and permeability performance of the membrane. In effect, the present membrane offers high permeability thanks to the characteristics of the carrier and the small thickness of the zeolite layer, and efficient separation thanks to the "zero defect" layer.

The membrane according to the invention has applications in the fields of fluid, gas or liquid separation, pervaporation, reverse osmosis or catalysis.

Some examples of gases that can be separated are: n- and iso-hydrocarbons having 4 to 8 carbon atoms; xylenes; $CH_4/N_2$ and $CH_4/CO_2$. In the case of gas separation, one embodiment has proven to be useful. In this embodiment, the zeolite is on the outer surface of a fiber (preferably single-channel). The gas to be treated thus permeates from the outer to the inner of the fiber; the gas is injected at the side of the cartridge. This allows having a tight seal at the potting: since the potting will be in contact with the outer surface of the fiber bearing the zeolite, no gas will be able to permeate through the thickness of the porous support that would otherwise be free at the potting level. Also, having the zeolite at the outer surface allows having higher pressures (up to 100 bar), since the fiber exhibits high compression resistance. Higher pressures mean higher flowrates and improved yields. Preparation process The present invention provides a method for preparing a membrane comprising a porous ceramic carrier and a layer of a molecular sieve, comprising the steps of: (i) preparing an inert solution and a precursor solution of the molecular sieve; (ii) impregnating the porosity of the carrier with the inert solution; (iii) bringing the region of the ceramic carrier intended to receive the layer of a molecular sieve into contact with the precursor solution, and bringing the region of the carrier not intended to receive the layer of a molecular sieve into contact with the inert solution; and (iv) forming a molecular sieve in situ.

First, the precursor solution is prepared containing the zeolite precursor species and the structuring agent, said species and agent being determined as a function of the final zeolite it is desired to obtain. In the case of a silicon-based zeolite, i.e. a silicalite, this solution contains silicon in the form of micronized silica or silicon alkoxide and, optionally, supplementary metallic species in the form of salts or alkoxides. Additionally, this solution contains an organic base such as a quaternary ammonium hydroxide and in particular ammonium tetrapropyl hydroxide, tetramethyl hydroxide or tetrabutyl hydroxide, or a mixture of an inorganic base such as soda and an ammonium tetraalkyl halide such as ammonium tetrapropyl bromide. The solution obtained is generally left to rest for a duration comprised for example between 1 and 96 hours, and preferably between 12 and 72 hours in order to lead to the desired precursor solution. The precursor solution can notably be the one described in international application WO-A-9529751. This solution is indicated to be an oligomer solution, the precursor elements being of small size, for example of nanometer order. This solution, preferably, does not contain a strong base.

In parallel, an inert solution is prepared; this solution is generally (distilled) water.

During steps (ii) and (iii), the precursor solution and the carrier are brought into contact so as to constitute a solution volume which will produce the zeolite. For this, the fiber is introduced into a glove finger (for example of PTFE) placed in an autoclave.

According to a first alternative embodiment, the porosity of the carrier is impregnated with the inert solution; and then, as a function of the desired structure of the zeolite membrane (in other words the position of the molecular sieve with respect to the fiber geometry) hydrothermal synthesis is performed using one or the other of the alternatives described below:

(i) If the zeolite layer is situated on the outside of the fiber, this embodiment comprises firstly, filling the volume of said channel(s) with the inert solution and secondly filling a volume surrounding the outside of the carrier with the precursor solution, this latter volume being the free volume of the glove finger.

(ii) If the zeolite layer is situated on the inside of the fiber channels, this embodiment comprises firstly filling a volume surrounding the outside of the carrier with the inert solution, this latter volume being the free volume of the glove finger and then secondly, filling the volume of the channel(s) with the precursor solution.

According to a second alternative embodiment, the porosity of the carrier is impregnated with the precursor solution and then, as a function of the desired structure for the zeolite membrane (in other words the position of the molecular sieve with respect to the fiber geometry) hydrothermal synthesis is performed using one or the other of the alternative embodiments described below:

(i) If the zeolite layer is situated in and on the outside of the fiber, this embodiment comprises firstly, filling the volume of said channel(s) with the inert solution and secondly filling a volume surrounding the outside of the carrier with the precursor solution, this latter volume being the free volume of the glove finger.

(ii) If the zeolite layer is situated in and on the inside of the fiber channels, this embodiment comprises firstly filling a volume surrounding the outside of the carrier with the inert solution, this latter volume being the free volume of the glove finger and then secondly, filling the volume of the channel(s) with the precursor solution.

In the above, the steps of impregnation with various solutions can be concomitant or sequential (when dealing with the same solution). For example, in the first case of the first alternative embodiment, the porosity of the carrier can be impregnated and the channels filled with the inert solution either simultaneously or sequentially.

The impregnation of the porosity with the precursor solution can, if desired, be only partial. The molecular sieve will then only be present in the impregnated region. As a function of the "depth" of impregnation (total or partial impregnation) or lack of impregnation, of the porosity of the carrier with the precursor solution, the location of the molecular sieve can be adjusted with precision.

Step (iv) in the formation of the molecular sieve generally comprises hydrothermal synthesis followed by calcinating.

Hydrothermal synthesis is generally done at a temperature comprised between 150 and 250° C., for a duration of 12 to 96 hours. The preferred conditions are a temperature comprised between 170 and 220° C. and a duration comprised between 48 and 84 hours.

After rinsing, generally using water, the membrane is calcined to eliminate the residual structuring agent. Calcinating is done in general at a temperature comprised between 300 and 900° C. and a duration from 2 to 5 hours; preferably, the calcinating conditions are a temperature of 400 to 600° C., notably 500° C. and a duration of about three hours. Calcination may or may not be oxidizing.

The conditions described in international application WO-A-9529751 are similarly suitable.

The present process makes it possible to provide a ceramic membrane having good gas separation properties in a single deposition-crystallization cycle.

The present method further offers the advantage of controlling, firstly, the inherent properties of the zeolite, such as channel size, acidity, hydrophobicity and, secondly, the properties of the composite material such as the location of the zeolite at a particular zone of the fiber geometry, characteristic of the zeolite deposit.

A further advantage of the present method is that of reduced manufacturing cost made possible firstly through the use of a low-cost porous carrier and secondly thanks to a limitation of the solution volumes employed, and finally thanks to an improved yield of the zeolite deposit. Indeed, the confinement of the reagents in the various compartments makes it possible to reduce solution volumes and consequently membrane manufacturing cost (the precursor solution comprising expensive reagents, notably, for example, the ammonium tetrapropyl hydroxide solution). Additionally, confinement of the solutions brings about an increase in crystal deposit yield, in other words in the ratio between the mass of molecular sieve deposited on the carrier fiber (and to a lesser degree in the carrier porous fiber) and the mass of the molecular sieve able to be produced from the volume of solution.

The method according to the invention is applied to the preparation of membranes according to the invention, but also to any type of membrane. Notably, the method according to the invention applies to non-symmetrical carriers.

The following examples illustrate the invention without limiting it.

In the examples below, a single-channel fiber is employed obtained as follows:

A paste is prepared constituted by alumina (mean particle size 3 µm), microcellulose, ethylcellulose, low density polyethylene particles (mean particle size 15 µm) and water, with the following composition in % by weight:

| | |
|---|---|
| Alumina | 69.7 |
| Microcellulose | 3.5 |
| Ethylcellulose | 0.3 |
| Low density polyethylene | 7 |
| Water | 19.5 |

The paste thus obtained had a drawability of 15. It was extruded through a hollow fiber die so as to form a 1.5 mm outside diameter and 0.8 mm inside diameter tube. The fiber thus obtained was fired at 1550° C. in a normal atmosphere.

EXAMPLE 1

An aqueous solution was prepared by mixing 60 g silica of the Aerosil 380 type from Degussa with 1000 ml of tetrapropyl ammonium hydroxide (TPAOH) molar solution. The solution was left to stand overnight. The porosity of the fiber was impregnated with the distilled water and the channel was filled with the silica solution. The fiber was placed in a PTFE glove finger of 1 cm diameter filled with distilled water, and the whole thing was placed in an autoclave; hydrothermal synthesis was carried out at 180° C. over 3 days. The fiber was then rinsed and then calcined at 500° C. for 5 hours.

The mass of zeolite deposited was 20 mg equivalent to a yield of 80% with respect to the mass of silica. Microscopic observation showed a layer deposited on the inner surface of the channels which was continuous and homogeneous the thickness of which was about 4 µm, the layer being infiltrated down to about 2 µm into the fiber.

The nitrogen permeability of this membrane was 4 $Nm^3$/$h.m^2.bar$.

EXAMPLE 2

The solution of example 1 was employed. The porosity of the fiber was filled with the distilled water as were the channel. The fiber was then placed in a glove finger of 0.2 cm diameter containing the precursor solution. The whole thing was placed in an autoclave and hydrothermal synthesis was carried out at 200° C. for 55 hours. The fiber was rinsed and then calcined at 500° C. for 5 hours.

The mass of zeolite deposited was 190 mg equivalent to a yield of 86% with respect to the mass of silica. Microscopic observation showed an outer layer which was continuous and homogeneous the thickness of which was about 28 µm, and a portion that had infiltrated about 1 µm into the fiber.

The nitrogen permeability of this membrane was 0.7 $Nm^3/h.m^2.bar$.

EXAMPLE 3

An aqueous solution was prepared by mixing 120 g silica of the Aerosil 380 type from Degussa with 100 ml of a molar solution of TPAOH. The solution was left to stand overnight. A ceramic tube of α-alumina of 10 mm outside diameter and 7 mm inside diameter was used, having a homogeneous structure the pore diameter of which was 12 µm. Initial nitrogen permeability of the ceramic tube was 7400 $Nm^3/h.m^2.bar$. The tube was placed inside a glove finger. The tube channel was filled with distilled water and the outside of the tube by the solution of silica and TPAOH. The complete thing was placed in an autoclave and hydothermal synthesis was performed at 190° C. for 72 hours. The tube was then rinsed and calcined at 500° C. for 2 hours.

The nitrogen permeability of the thus-treated tube was 2500 $Nm^3/h.m^2.bar$, sulfur hexafluoride permeability was 900, equivalent to a selectivity of 2.8. This shows that it is possible to have crystalline growth even for carriers with a very high pore dimension.

After repeating the process, the tube was sulfur hexafluoride-tight.

The fibers of the invention, assembled into modules, thus provide a very high degree of compactness.

The invention is not limited to the embodiments described but may be the subject of numerous variations readily accessible to the person skilled in the art.

What is claimed is:

1. A method for preparing a membrane comprising a homogeneous porous carrier having a pore diameter comprised between 5 nm and 20 µm, on which a layer of a molecular sieve is deposited, comprising the following steps:
   (i) preparing an inert solution and a precursor solution of the molecular sieve;
   (ii) impregnating the porosity of the carrier with the inert solution and/or the precursor solution;
   (iii) bringing the region of the carrier intended to receive the layer of said molecular sieve into contact with the precursor solution, and bringing the region of the carrier not intended to receive the layer of said molecular sieve into contact with the inert solution; and
   (iv) forming said molecular sieve in situ.

2. The method according to claim 1, in which the carrier is a carrier comprising at least one channel.

3. The method according to claim 2, in which the steps (ii) and (iii) comprise: firstly, filling the volume of said at least one channel and pores of the carrier with the inert solution and, secondly, filling a volume surrounding the outside of the carrier with the precursor solution.

4. The method according to claim 2, in which the steps (ii) and (iii) comprise: firstly, filling a volume surrounding the outside of the carrier and the pores of the carrier with the inert solution and, secondly, filling the volume of said at least one channel with the precursor solution.

5. The method according to claim 2, in which the steps (ii) and (iii) comprise: firstly, filling the volume of said at least one channel with the inert solution and, secondly, filling a volume surrounding the outside of the carrier with the precursor solution.

6. The method according to claim 2, in which the steps (ii) and (iii) comprise: firstly, filling a volume surrounding the outside of the carrier with the inert solution and, secondly, filling the volume of said at least one channel and of the pores of the carrier with the precursor solution.

7. The method according to claim 1, in which the precursor solution is an aqueous solution comprising a precursor agent for the molecular sieve and a structuring agent.

8. The method according to claim 1, in which the precursor solution is aged prior to its use for a duration comprised between 1 and 96 hours.

9. The method according to claim 8, in which the precursor solution is aged prior to its use for a duration comprised between 12 and 72 hours.

10. The method according to claim 1, in which the inert solution is an aqueous solution.

11. The method according to claim 1, in which step (iv) in the formation of the molecular sieve comprises a hydro thermal synthesis followed by calcinating.

12. The method according to claim 11, in which the precursor solution is an aqueous solution comprising a precursor agent for the zeolite and a structuring agent, which is aged prior to its use for a duration comprised between 12 and 72 hours, and in which the inert solution is an aqueous solution.

13. The method according to claim 11, in which step (iv) in the formation of the zeolite comprises a hydrothermal synthesis followed by calcinating.

14. A method for preparing a membrane comprising a homogeneous porous ceramic fiber having a pore diameter comprised between 5 nm and 10 $\mu$m, on which a single zero-defect unitary layer of a zeolite is deposited, said layer having no break in its macroscopic three-dimensional structure and said layer having a thickness comprised between 3 and 50 $\mu$m, comprising the following steps:

(i) preparing an inert solution and a precursor solution of said zeolite;

(ii) impregnating the porosity of the fiber with the inert solution and/or the precursor solution;

(iii) bringing the region of the ceramic fiber intended to receive the layer of said zeolite into contact with the precursor solution, and bringing the region of the fiber not intended to receive the layer of said zeolite into contact with the inert solution; and (iv) forming said zeolite in situ.

15. The method according to claim 14, in which the fiber comprises at least one channel.

16. The method according to claim 15, in which the steps (ii) and (iii) comprise: firstly, filling the volume of said at least one channel and pores of the fiber with the inert solution and, secondly, filling a volume surrounding the outside of the fiber with the precursor solution.

17. The method according to claim 15, in which steps (ii) and (iii) comprise: firstly, filling a volume surrounding the outside of the fiber and the pores of the fiber with the inert solution and, secondly, filling the volume of said at least one channel with the precursor solution.

18. The method according to claim 15, in which the steps (ii) and (iii) comprise: firstly, filling the volume of said at least one channel with the inert solution and, secondly, filling a volume surrounding the outside of the fiber with the precursor solution.

19. The method according to claim 15, in which steps (ii) and (iii) comprise: firstly, filling a volume surrounding the outside of the fiber with the inert solution and, secondly, filling the volume of said at least one channel and the pores of the fiber with the precursor solution.

* * * * *